May 17, 1938.                H. Z. COBB                2,117,400
              APPARATUS FOR COVERING ARTICLES
                  Filed Jan. 7, 1933        11 Sheets-Sheet 1
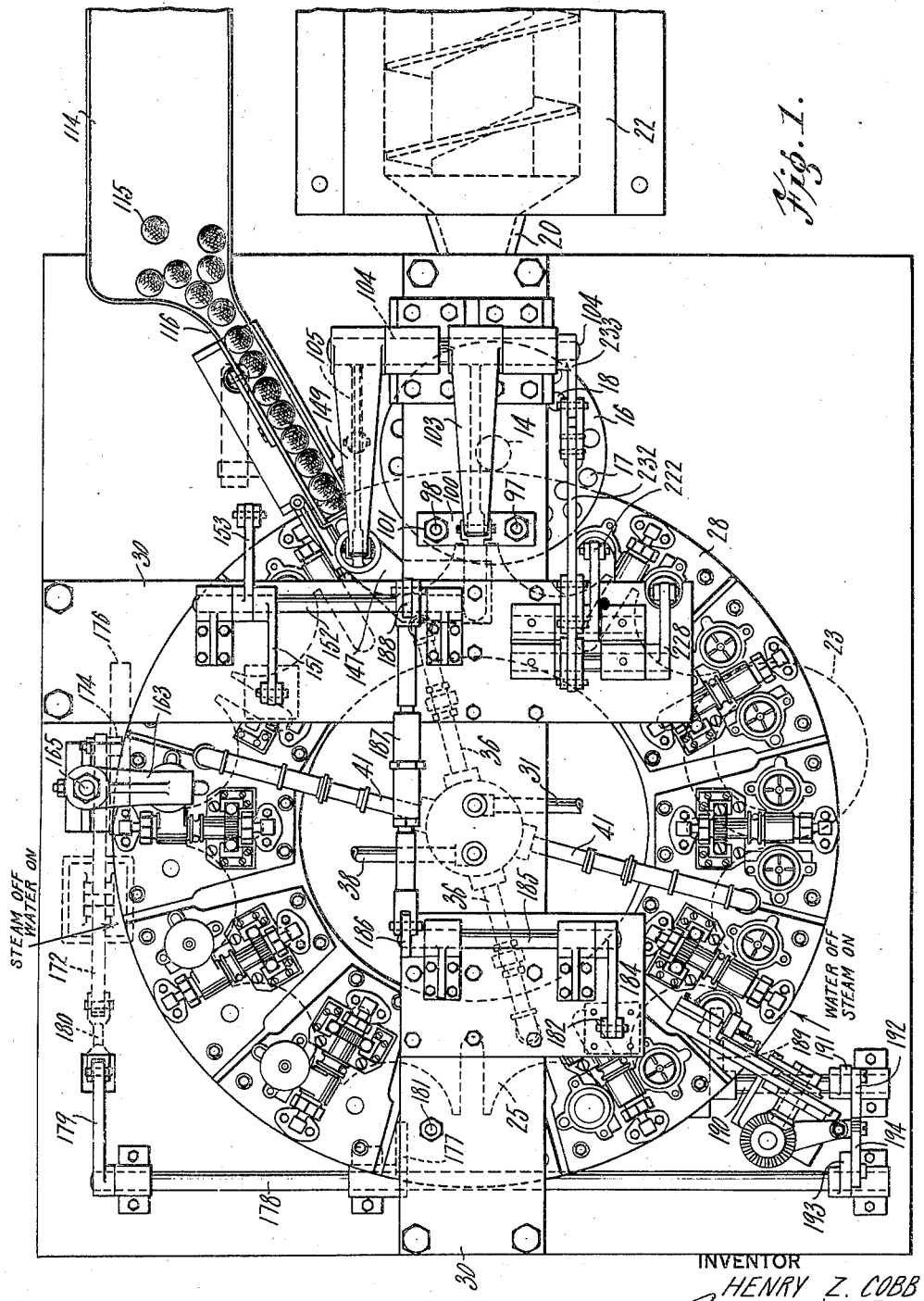
INVENTOR
*HENRY Z. COBB*
BY 
ATTORNEY

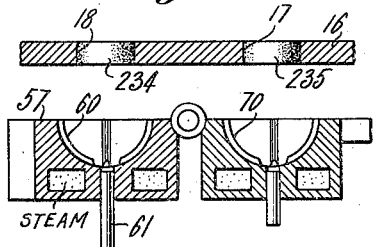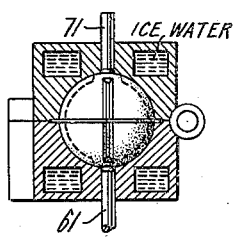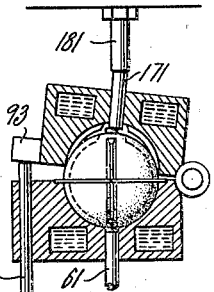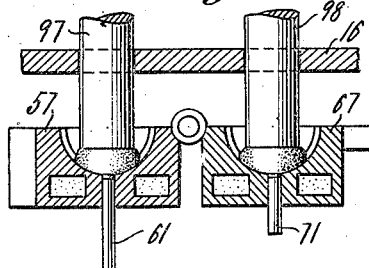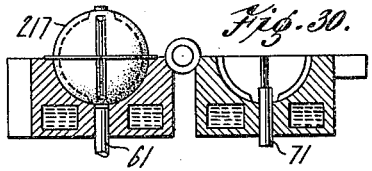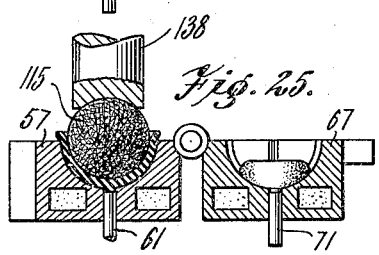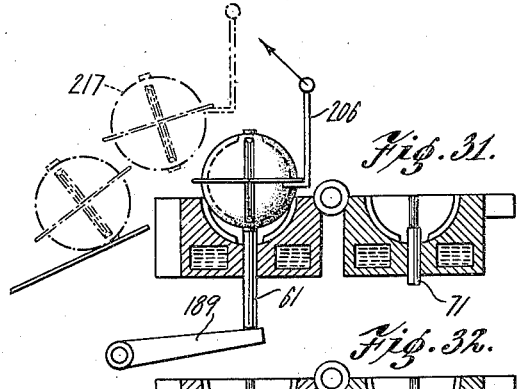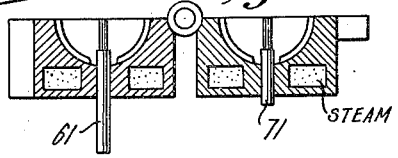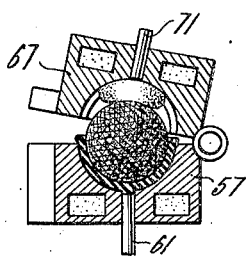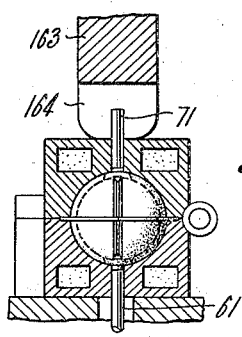

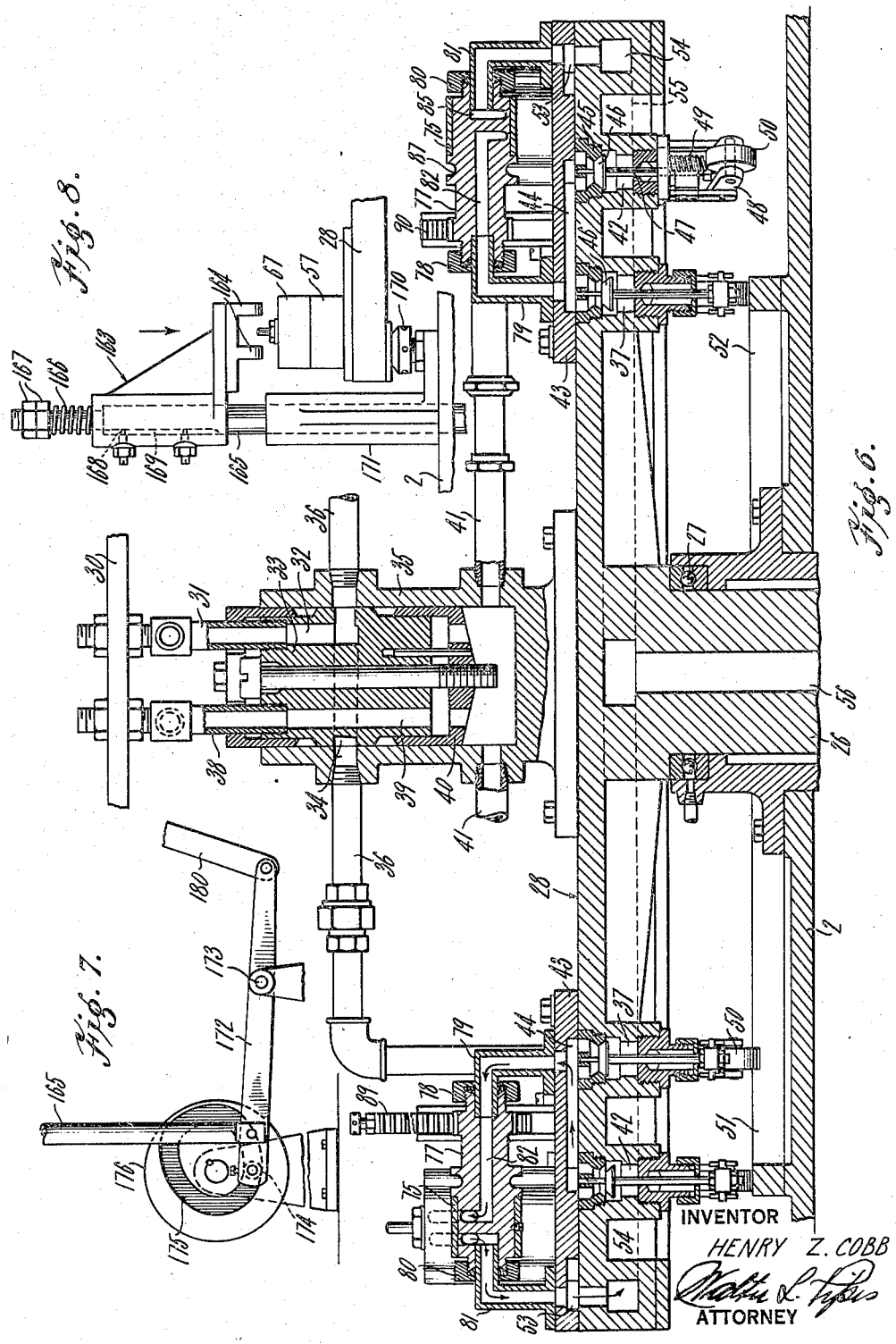

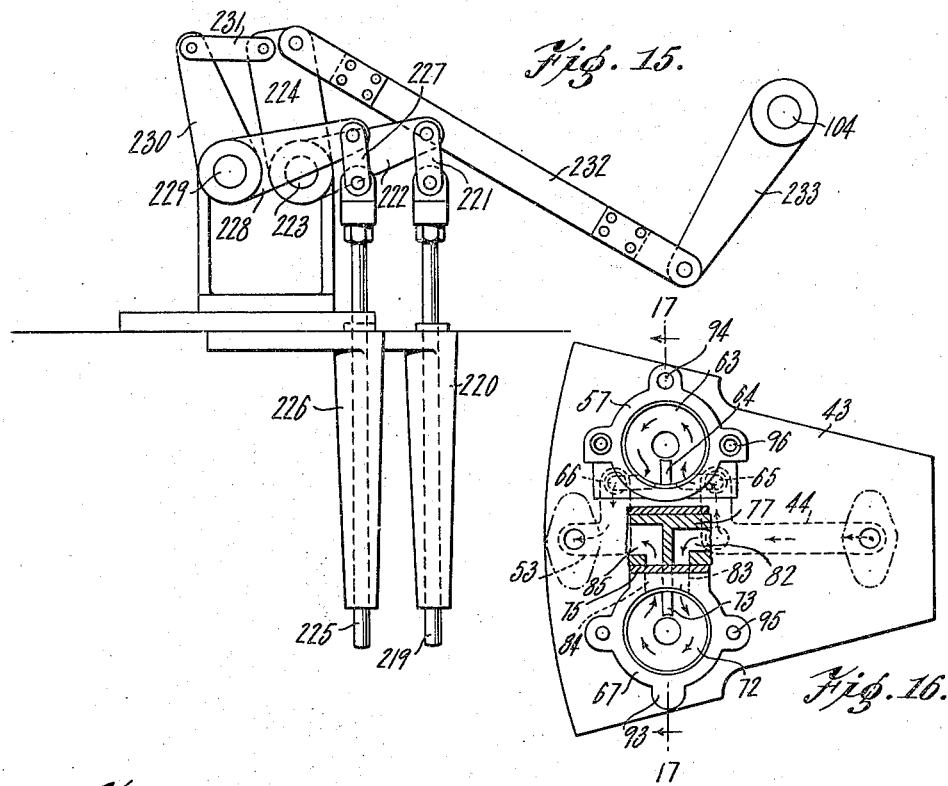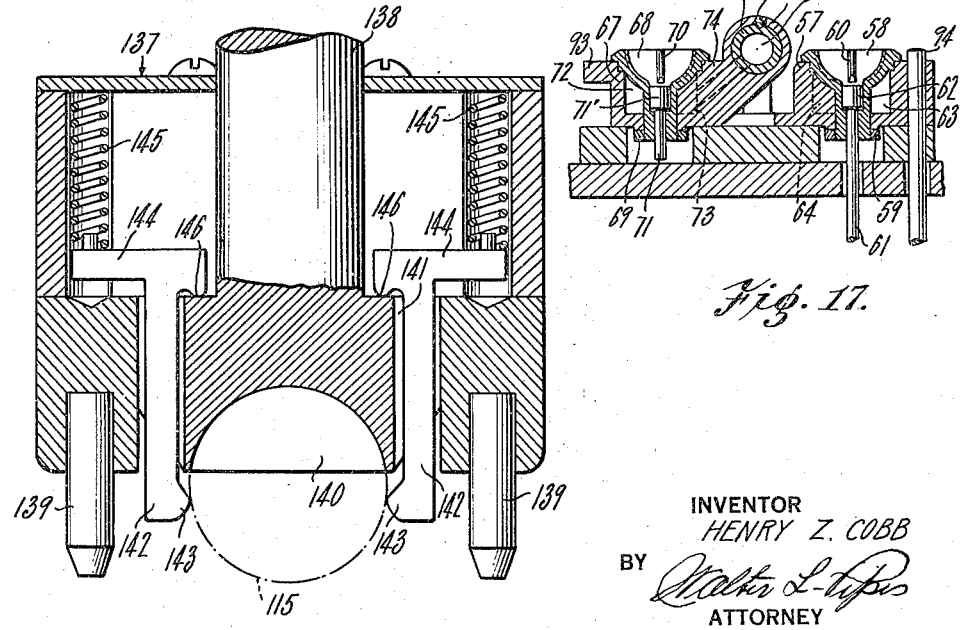

May 17, 1938. H. Z. COBB 2,117,400
APPARATUS FOR COVERING ARTICLES
Filed Jan. 7, 1933 11 Sheets-Sheet 5
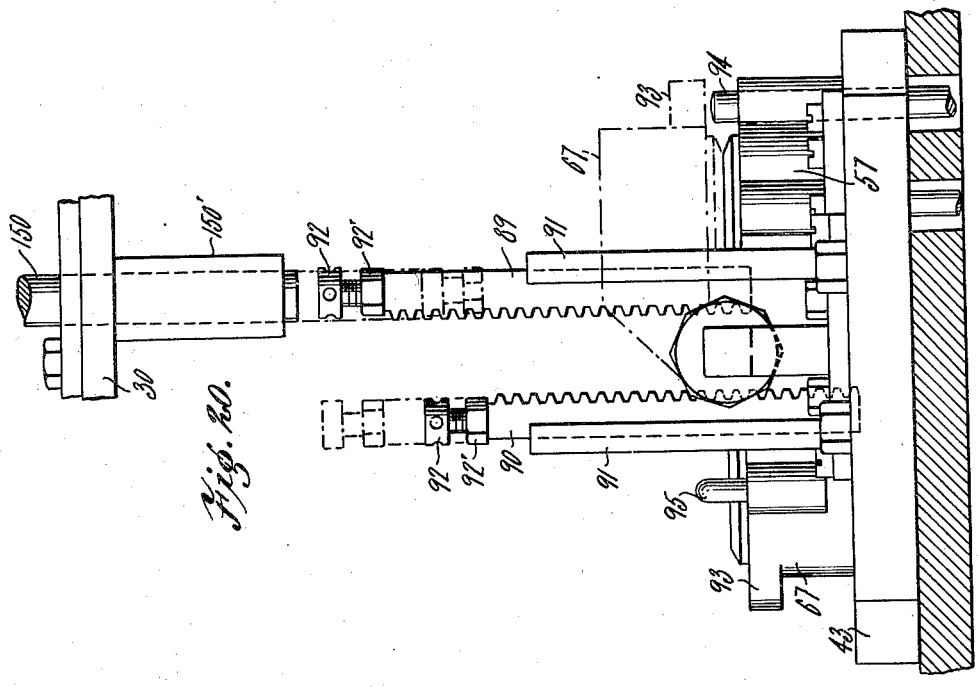
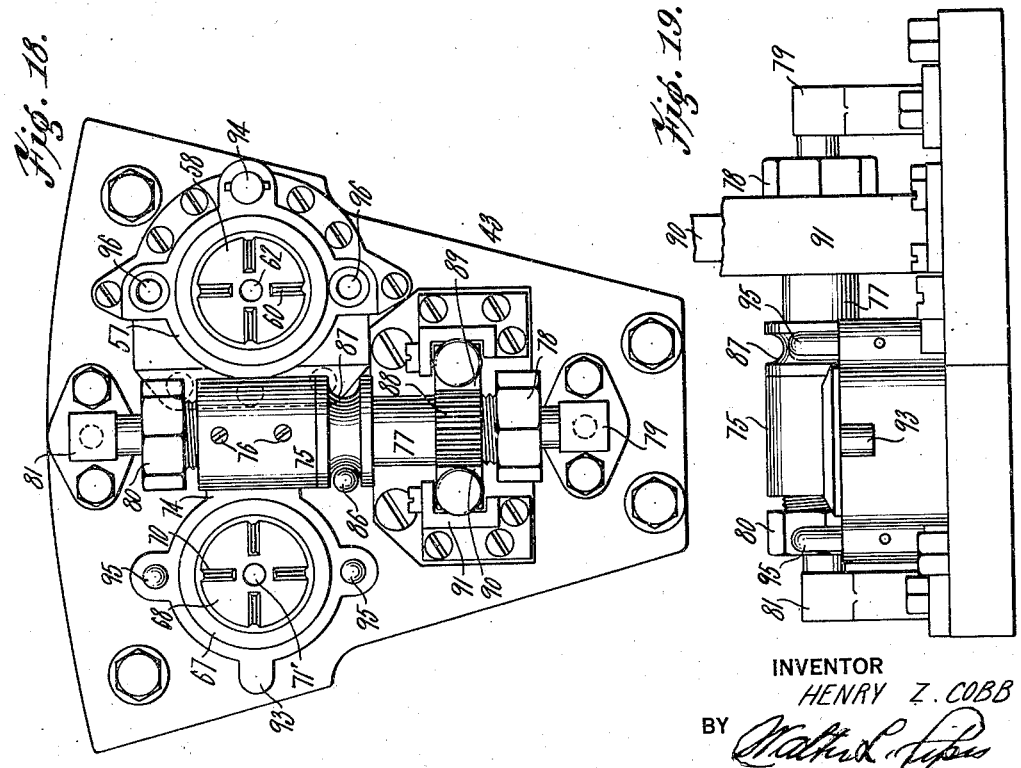
INVENTOR
HENRY Z. COBB
BY
ATTORNEY May 17, 1938. H. Z. COBB 2,117,400
APPARATUS FOR COVERING ARTICLES
Filed Jan. 7, 1933 11 Sheets-Sheet 6
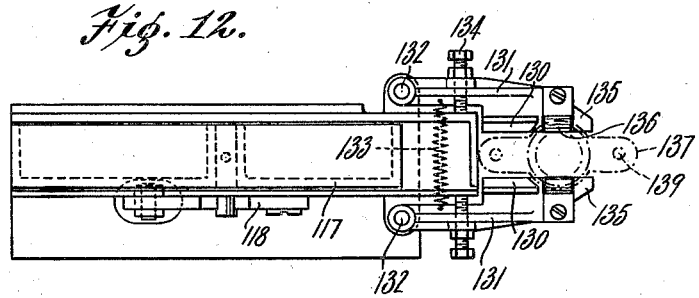
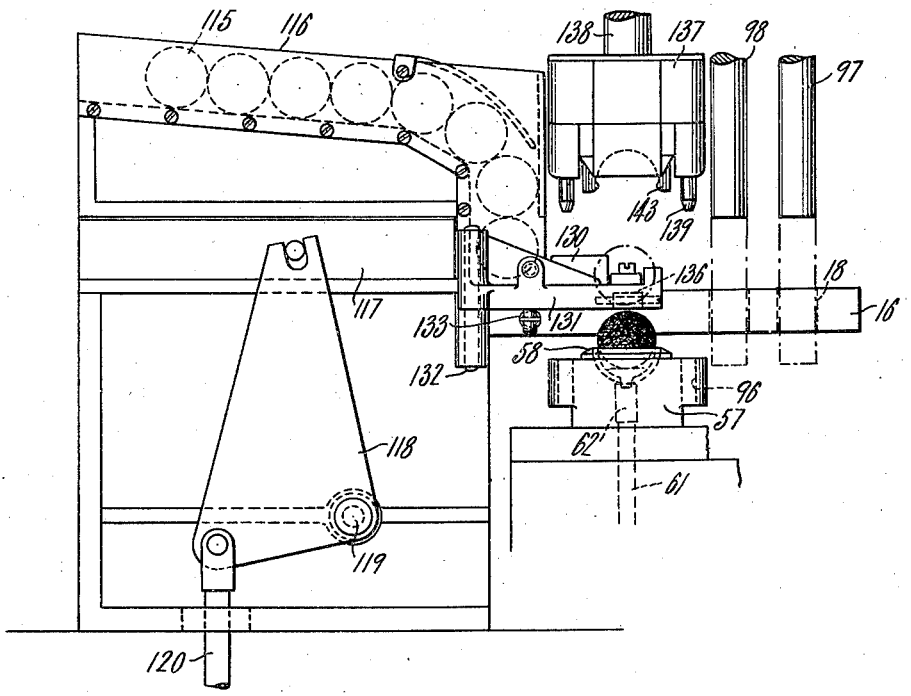
INVENTOR
HENRY Z. COBB
BY
ATTORNEY May 17, 1938.    H. Z. COBB    2,117,400
APPARATUS FOR COVERING ARTICLES
Filed Jan. 7, 1933    11 Sheets-Sheet 7
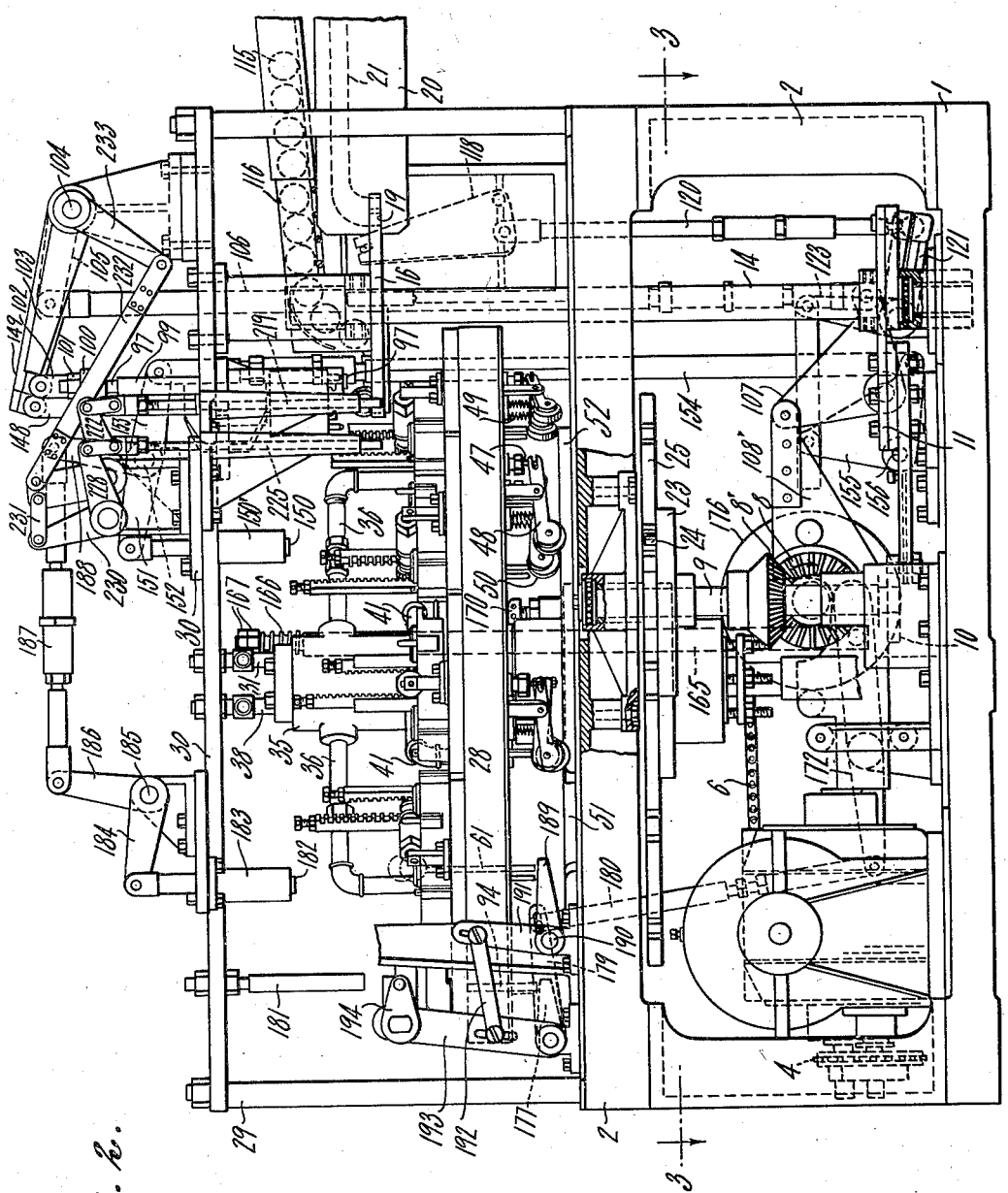
INVENTOR
HENRY Z. COBB
BY
ATTORNEY

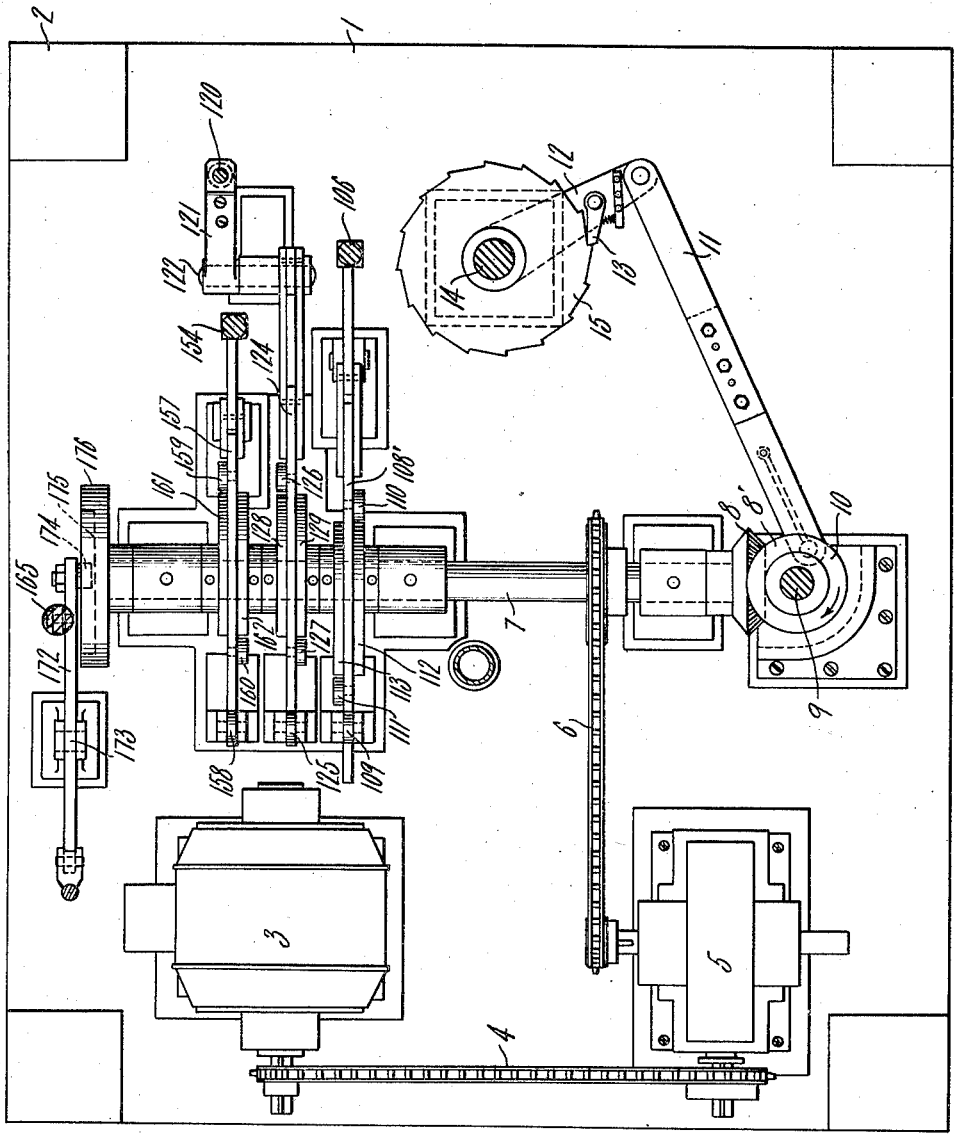

INVENTOR
HENRY Z. COBB
BY
ATTORNEY

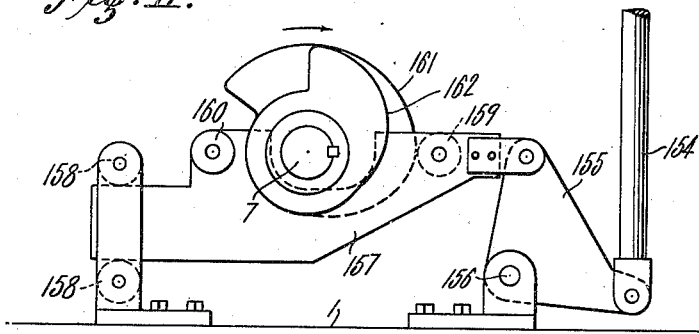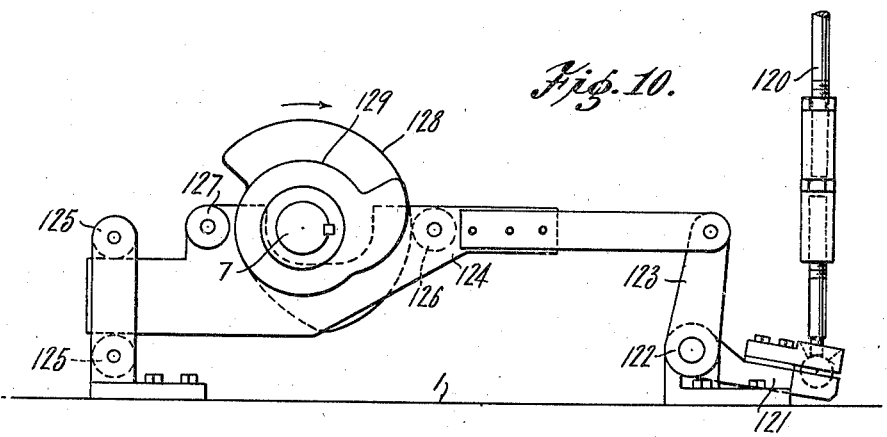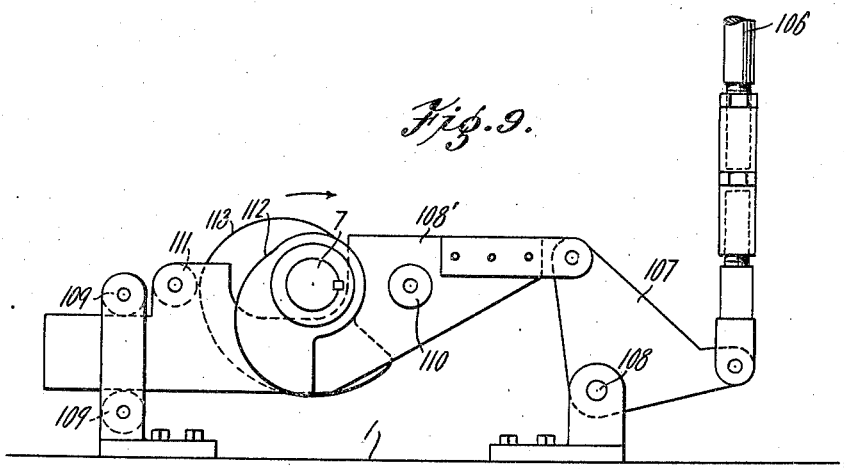

INVENTOR
HENRY Z. COBB
BY
ATTORNEY

Patented May 17, 1938

2,117,400

UNITED STATES PATENT OFFICE 2,117,400

APPARATUS FOR COVERING ARTICLES

Henry Z. Cobb, Providence, R. I., assignor, by mesne assignments, to United States Rubber Company, New York, N. Y., a corporation of New Jersey Application January 7, 1933, Serial No. 650,604

14 Claims. (Cl. 18—20)

This invention relates to a process and apparatus for covering articles with plastic stock, and more particularly to a process and apparatus for covering golf ball cores directly from heated plastic blanks of cover stock.

In the manufacture of golf balls, after the usual winding of the core with tense rubber thread, it is necessary to provide a tough, resistant cover formed with the usual mesh or other markings. This cover is usually made of balata or balata composition, and it has previously been necessary to preliminarily mold blanks of the cover stock into two hemispherical halves and then place the cover halves around the wound core and insert the assembly in a mold for the final molding operation, in which latter the cover halves are united with each other and with the core and the mesh or other markings are produced on the cover. This procedure has been necessary because up to the present time if an attempt is made to produce the final molded cover directly from blanks of the cover stock, it is impossible to accurately center the wound core in the cover stock. Obviously, if the core is not centered in the cover stock, it will not fly true when struck and will not putt accurately. However, the prior process of first molding hemispherical halves of the cover stock is at best but a makeshift, and it insures only that in most cases the core will be fairly accurately centered, since in the final molding operation a certain amount of flow of the balata occurs even when the preliminarily molded halves are used, and it is not possible to control this flow so as to maintain the core exactly centered in the mold during the molding operation.

A further objection to the prior method is the waste of time, labor, space and heat required in preliminarily molding the halves of the cover. In this latter operation, the balata after being formed into strips must be cut into small pieces containing approximately the amount of cover stock required to form one of the half shells, and due to the fact that all of the operations cannot be performed at the same spot, these blanks generally have become cooled before they are ready for molding into the hemispherical halves. Due to factory exigencies the molded cover halves frequently must be kept for some time before they can be finally molded around a core, so that they have again become cooled before such final molding operation. In addition, in cases where it is desired to vulcanize the balata cover by including in the cover stock a high powered vulcanizing combination, the frequent preliminary heatings and the delay before the final molding operation are liable to cause prevulcanization of the cover stock.

An object of my invention is to provide an improved process for molding covers of plastic stock on articles. Another object is to provide a process for continuously molding such covers on articles. A further object is to provide an automatic apparatus for the preliminary molding of golf ball and similar covers directly on the object to be covered. A still further object is to provide a molding apparatus in which the wound golf ball core will be accurately centered in the mold cavity. A still further object is to provide an apparatus for continuously applying and molding golf ball covers. A still further object is to provide an apparatus for directly molding blanks of heated plastic stock into covers on golf balls without preliminary shaping of the blanks. A still further object is to reduce the labor, time, space, equipment and heating required in the making of golf balls.

For a detailed disclosure of the nature and objects of the invention, reference is made to the accompanying specification and drawings, in which latter:

Figure 1 is a top plan view with parts omitted and broken away;

Figure 2 is a side elevation with parts omitted and broken away;

Figure 3 is a horizontal section on the line 3—3 of Fig. 2;

Figure 6 is a central vertical section through the turn table showing details of the steam and cold water supplies to the molds;

Figure 7 is a detail of the cam for operating the mold pressing ram, and also for operating the mold cracker and ball ejector;

Figure 8 is a detail of the mold pressing ram;

Figure 9 is a detail of the cams for operating the balata placing, core placing and ejector replacing mechanisms;

Figure 10 is a detail of the cams for operating the core feeding mechanism;

Figure 11 is a detail of the cams for operating the mold closing and opening mechanism;

Figure 12 is a detail top plan view of the core feeding and placing mechanism;

Figure 13 is a detail side view of the core feeding and placing mechanism;

Figure 14 is an enlarged detail sectional view of the core placing mechanism;

Figure 15 is a detail view of the replacing mechanism for the ball ejectors;

Figure 16 is a part plan and part sectional detail of the steam and cold water supplies to the mold halves;

Figure 17 is a detail vertical section of the mold halves on the line 17—17 of Fig. 16;

Figure 18 is a plan view of the mold halves;

Figure 19 is a broken side elevation of a mold;

Figure 20 is a detail of the mold closing mechanism;

Figures 23 to 33 are diagrammatic views illustrating a complete cycle of molding operations on a core.

Figure 5:
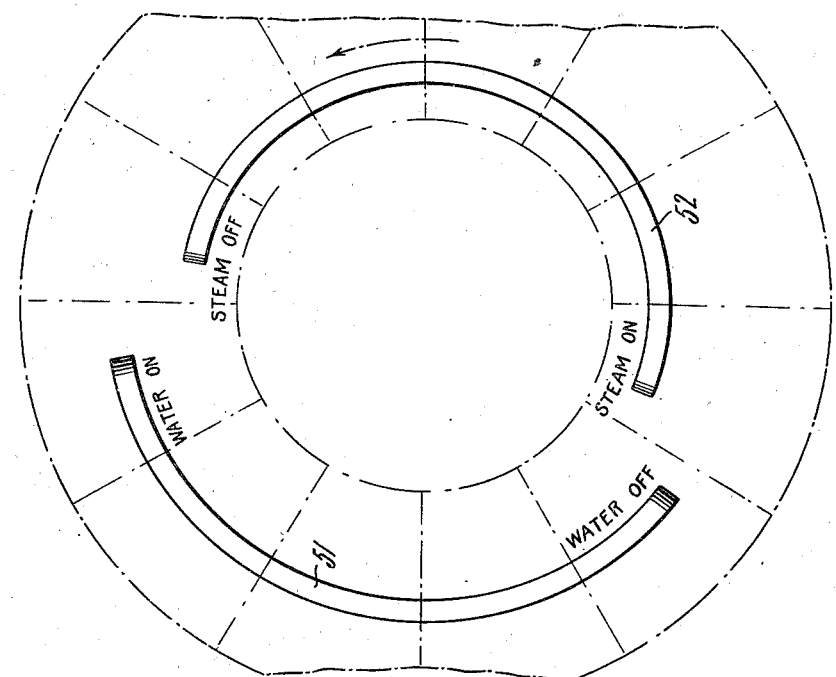
Figure 5 is a plan showing the cams for operating the steam and cold water valves.

In order that the detailed explanation of the process and the apparatus for carrying it out may be more easily followed, the following brief description is given of an embodiment of the process and apparatus for the preliminary molding of covers on golf ball cores.

In carrying out the process, a series of pairs of golf ball half molds, one of each pair being hingedly mounted to swing over on the other, are moved in a closed path, which in the present instance is obtained by mounting the molds on a carrier such as a turn table. Each half mold is provided with projections which extend inwardly from its inner surface to a distance sufficient to engage a wound core and hold it centered in the mold. Means are provided for heating the molds prior to the molding operation, and for then cooling the molds for a period before the molded ball is ejected from a mold. In the rotation of the turn table, the open molds are first heated by steam, and then a pair of the molds comes to the station where blanks of heated plastic cover stock, such as a balata composition, are supplied to the mold halves. The plastic cover stock is extruded from a tubing machine in accurately measured amounts into openings disposed in a rotating carrier adjacent its edge, and in the rotation of this carrier two of these filled openings come into position over the open empty mold halves, after which plungers eject the blanks and force them down into the mold halves. In the continued rotation of the turn table, this pair of mold halves with the balata blanks therein, comes opposite a station where a wound core is automatically supplied and forced down into the lower half of the mold on top of the plastic balata blank previously disposed therein. Following this, the hinged half of the mold with its inserted balata blank is swung over on top of the wound core resting in the lower half, and the mold then passes beneath a ram which forces the two halves of the mold tightly together so as to carry out the molding operation. During the flow of the plastic balata in the molding operation the wound core is held centered by the projections on the inner surface of the mold. Following this, the supply of steam to the mold is cut off and instead cold water is supplied thereto so as to quickly cool the molded ball and enable it to be removed without distortion of the cover. After having been sufficiently cooled, the mold then comes to a station where the mold is "cracked", that is, the mold halves are forced slightly apart, and during this operation a small pin movable in the top half of the mold is held fixedly against the molded ball so that the latter will remain in the lower half of the mold and not adhere to the upper half as the latter is swung back into open position. Following the "cracking" operation, the upper half of the mold is swung back to open position. The mold then is carried to the ejecting point, where a small pin in the bottom of the bottom half of the mold is moved upwardly to dislodge and slightly elevate the ball, and an ejector hook moves down, engages the molded ball by its molding overflow or flash, and throws the ball out of the mold into a chute or other suitable receptacle. Cold water is then cut off from the mold and steam again turned on, the ejector pins in the mold halves returned to inoperative position, and the mold then again moves to the starting point for the reception of further cover material and a repetition of the previous operations.

DETAILED DESCRIPTION

*Main drive mechanism*

Referring more particularly to Figs. 2 and 3, there is shown a base 1 carrying a main frame 2 upon which members the various parts are supported. In the present instance the drive is through an electric motor 3, which through a chain and sprocket connection 4 drives a speed reduction mechanism 5, the latter in turn through a chain and sprocket connection 6 driving a main shaft 7, by which latter all moving parts of the machine are driven. At one end of the main shaft is disposed a gear 8 which through the gear 8' drives a vertical shaft 9, which latter through a Geneva stop mechanism drives the main turn table in a manner to be later described.

*Balata measuring and feeding mechanism*

Disposed at the bottom of shaft 9 is a crank disc 10 which through the link 11 drives a pawl arm 12 carrying a spring pressed pawl 13. The pawl arm 12 oscillates on a vertical shaft 14, which latter carries a ratchet wheel 15 cooperating with the pawl 13. Mounted on the shaft 14 and rotated by the step by step movement of the pawl and ratchet mechanism, is a balata measuring and feeding carrier in the form of a disc 16 (Figs. 1 and 2). This disc is provided with an outer series of apertures 17 and an inner series of similar apertures 18, which apertures have a capacity slightly greater than the amount of balata necessary to make one half of a ball cover. Referring to Fig. 2, it will be noted that the outer portion of the disc 16, in which the apertures 17 and 18 are located, passes with a smooth sliding fit through a groove 19 cut in the end of a nozzle 20, which nozzle has a passageway 21 communicating with the top of the groove 19 at one end and at the other end with a balata extruding mechanism 22. Thus, it will be seen that as the balata is extruded through the passage 21, it successively fills the openings 17 and 18 in the balata measuring disc as the latter is rotated with a step by step motion through the groove 19. In the further rotation of the disc 16, the filled apertures 17 and 18 arrive at a position in which a filled aperture 17 and a filled aperture 18 are disposed directly above a pair of golf ball mold halves which are to be charged, and the measured amounts of balata are forced out of the apertures 17 and 18 and down into the mold halves in a manner to be later described.

Mold turn table and drive

Mounted on the shaft 9 is the driving member 23 of a Geneva stop movement, which through the pin 24 actuates the driven member 25 of the Geneva movement (Figs. 1 and 2). The driven member 25 is mounted on a hollow shaft 26, which latter is provided with a bearing 27 carried by the main frame 2 (Fig. 6). Disposed at the top of the hollow shaft 26 is the main turn table 28 which carries the mold halves adjacent its periphery, and which latter will be later described.

Steam and water supplies to mold halves

Figure 4:
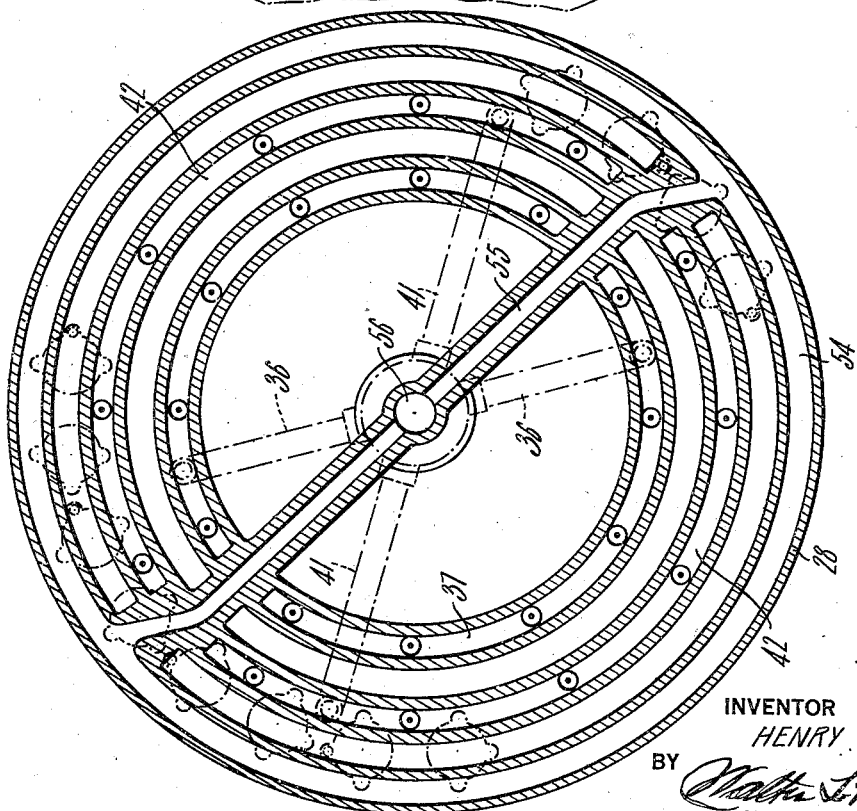
Figure 4 is a horizontal section through the turn table showing the steam and cold water supply passages and the location of the governing valves.
Figure 21:
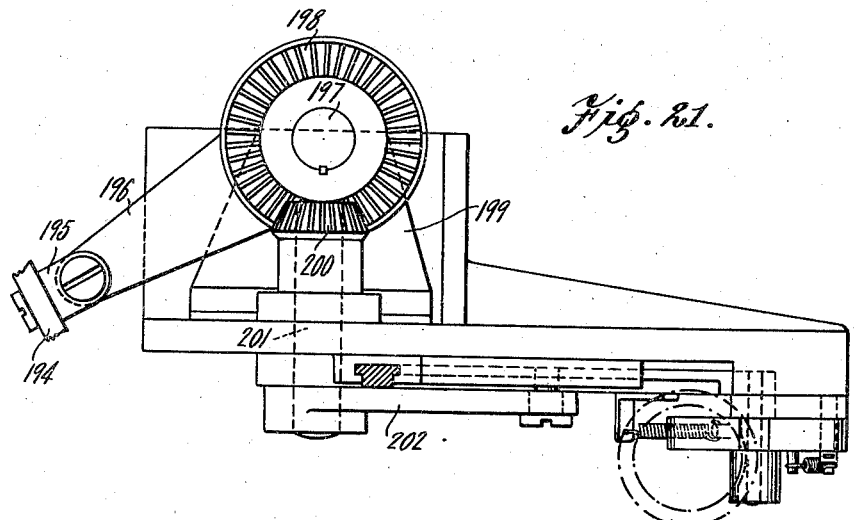
Figure 21 is a detail top plan view of the ball ejecting mechanism.

Steam and cold water are supplied at desired intervals to each of the mold halves, the steam being supplied first to an empty mold half to properly heat it before the molding operation, after which the steam is shut off from that mold and cold water is supplied to quickly set the cover so that the molded ball can be removed without injury. The steam and water are supplied through a central fixed connection to passages in the turn table 28 from which passages they are supplied by automatically controlled valves to the mold halves at the proper time. Referring more particularly to Figs. 1, 2 and 6, the top of the main frame 2 is provided with supports 29 upon which are carried crossed plates or bars 30. Secured in one of the plates 30 (Fig. 6) is a steam supply pipe 31 which communicates with a passage 32 in a fixed circular plug 33 to which latter the steam pipe is secured. The plug 33 is provided with an external circumferential groove 34 in communication with the passage 32. Surrounding the plug 33 is a steam and water jacket 35 which is secured to the main turn table 28 and rotates therewith. The groove 34 communicates with steam pipes 36 tapped into opposite sides of the jacket 35, which pipes at their opposite ends lead down into approximately semi-circular steam passages 37 in the turn table (Figs. 4 and 6).

Also connected to the plate 30 is a water pipe 38 which is threaded into the plug 33 and communicates with a passage 39 in the plug 33, which latter passage leads through openings in a packing gland nut 40 to a space in the bottom of the steam and water jacket 35. Communicating with this space are water pipes 41 which at their opposite ends lead into the approximately semi-circular passages 42 in the turn table 28, the passages 42 being concentric with the steam passages 37.

As the same valve construction is used for governing both the flow of steam and cold water, but a single valve will be described. A base plate 43 for each pair of mold halves (Fig. 6) is attached to the turn table 28, and each base plate has in its bottom a passage 44 which is adapted to communicate with either the steam passage 37 or the cold water passage 42 through automatically controlled valves. Each valve comprises a valve seat 45 which is preferably detachably secured in the turn table 28 as by screw threads, and cooperating with the valve seat is a valve 46 having a downwardly extending stem 47, which latter is connected to one end of an operating lever 48 pivotally supported from the bottom of the turn table (Figs. 2 and 6). A spring 49 bearing against the valve lever tends to normally hold the valve in closed position, while a cam roller 50 attached to the outer end of the valve lever 48 is adapted at the proper time to engage (in the case of the water valves) a cam 51 (Figs. 2 and 5) mounted on the main frame 2. When the roller 50 thus engages the cam 51, the water valve 46 is opened, thereby admitting cold water from the passage 42 into the passage 44 in the base plate of a pair of mold halves. The valves governing the flow of steam from the passages 37 into passages 44 are identical in all respects with the valve first described, but are operated by a cam 52 also mounted on the main frame 2 (Figs. 2 and 5).

Also formed in the bottom of base plate 43 is an exhaust passage 53 leading from the mold in a manner to be later described, and through which steam or cold water discharged from the mold may pass into a circular passage 54 in the turn table 28, from which passage branch passages 55 conduct the exhaust material into the passage 56 in the hollow shaft 26 of the turn table and thence to any suitable outlet.

Molds

Mounted on each base plate 43 (Figs. 16 to 19) is a stationary mold half casing 57 in which is fitted a hemispherical half mold 58, and preferably the half mold is removably held as by a nut 59. In each half mold are a series of projections, which in the present instance are in the form of ribs 60 tapering from their bases to their inner edges. These ribs project inwardly from the surface of the mold half sufficiently to exactly center a wound golf ball core on their inner edges when the core is placed in the mold and to space the core from the mold a distance sufficient to provide the proper thickness of cover. In the bottom of the mold 58 is a small pin or plunger 61 having an enlarged head 62, which plunger is actuated at the proper time to elevate a molded ball in the mold.

Formed in the mold casing 57 beneath the mold is a chamber 63 for the reception of steam or cold water, and in order to insure proper circulation of the fluid in the chamber a baffle 64 projects inwardly from the mold casing 57. At one side of the baffle a passage 65 leads into the chamber 63, this passage communicating through the passage 44 in the base plate with either the steam or cold water supplies, depending upon which valve 46 is open. On the opposite sides of the baffle 64 a passage 66 leads from the chamber 63 and communicates with the exhaust passage 53 in the base plate 43.

The other or movable half mold casing 67 is similar to that already described, and an upper mold half 68 is mounted in it and secured in position by nut 69. This mold half is provided with projecting ribs 70 similar to the ribs 60 already described. In the bottom of the mold half is a small pin or plunger 71 having an enlarged head 71', which is operated at the proper time when a filled mold is being opened, to prevent adhesion of a molded ball to the top half of the mold. The movable mold half casing is provided with a steam and water chamber 72 beneath the mold half, and in order to cause proper circulation a baffle 73 is located in the chamber. The mold half casing 67 is carried on an arm 74 provided with a sleeve 75 which is secured by set screws 76 to a hollow shaft 77. The shaft 77 is rotatably mounted at one end (Figs. 6 and 18) by means of a stuffing box 78 on the end of a hollow combined steam or water supply pipe and supporting bracket 79, the interior of which pipe is in communication with the passage 44 in the base plate. At the opposite end the hollow shaft 77 is mounted by a stuffing box 80 on the combined steam and water exhaust pipe and supporting bracket 81, which latter communicates with the exhaust passage 53 in the base plate 43. The hollow shaft 77 is provided with a passage 82 communicating with the steam or water supply bracket 79 at one end and at its opposite end with a passage 83 (Fig. 16) in the mold casing 67, which passage leads into the chamber 72 in the mold casing at one side of baffle 73. Leading from the chamber 72 at the opposite side of baffle 73 is an exhaust passage 84 communicating with a passage 85 in the hollow shaft 77, which latter passage communicates with the hollow bracket 81 leading into the exhaust passage 53 in the base plate 43.

In order to prevent lateral movement of the movable mold half section, a pin 86 (Fig. 18) is provided on the base plate which cooperates with a groove 87 in the hollow shaft 77 to prevent such movement.

In order to actuate the movable mold casing 67 to close and open the mold, the shaft 77 is provided with a pinion 88 (Fig. 18) which cooperates with racks 89 and 90 movable vertically in guides 91 in the base plate. Each rack is provided at its upper end with a contact pin 92 which is adjustable and is held in adjusted position by the lock nut 92'. The racks 89 and 90 are operated in the proper sequence, and in a manner to be later described, to respectively swing over the hinged top half of the mold casing to closing position or to swing the top half back into open position.

The movable half mold casing 67 is provided with a projecting lug 93 which when the movable half is in closed position is located directly over a plunger 94 slidable in the fixed half, which plunger is operated at the proper time in the molding operation to "break" the mold, that is, to initially separate the two sections of the mold. The movable half of the mold casing is also provided with opposed dowel pins 95 which when the movable half is moved to closed position, enter the openings 96 in the fixed half of the mold to center the two mold sections.

*Balata placing mechanism*

As an empty pair of half molds are operated by the Geneva stop mechanism to bring them to a position below the balata measuring and feeding disc 16 (Figs. 1 and 2), they come into a position in which the fixed half mold is directly below a filled opening 18 in the balata feeding disc 16, and the movable half section of the mold is directly below a balata filled opening 17 in the disc. A balata ejecting plunger 97 is located directly above the opening 18, and a second balata ejecting plunger 98 is located directly above the filled opening 17. These plungers are guided in vertical guides 99 secured to the transverse plate 30, and at their upper ends they are joined by a bridge plate 100 to which they are secured by the nuts 101. A link 102 secured to the central portion of the bridge plate 100 is pivoted at its upper end to a rock arm 103, which latter is secured to a rock shaft 104. Also secured on the rock shaft 104 is a rock arm 105, to the outer end of which is pivoted a downwardly extending adjustable link 106, and at the lower end of this link (Fig. 9) it is secured to one arm of the crank 107 pivoted on the base plate at 108. The other arm of the crank is pivoted to one end of the cam slide 108', the other end of the slide being movable in the roller guides 109. The cam slide 108' is provided on opposite faces with cam rollers 110 and 111, the first of which is actuated by a cam 112 secured on the main drive shaft 7 to move the cam slide to the right as shown in Fig. 9, while the cam roller 111 cooperates with a cam 113 on the main drive shaft 7 to move the cam slide 108' to the left as shown in Fig. 9. These cams are properly timed to actuate the plungers 97 and 98 each time a pair of empty half molds is brought beneath the balata feeding disc 16.

*Core feeding mechanism*

In the next actuation of the turn table by the Geneva stop mechanism, the pair of half molds which have just been supplied with the balata blanks are brought to the next station, at which a wound core is supplied to the fixed half of the mold. A trough or table 114 (Figs. 1 and 2) is provided upon which the wound cores 115 are placed and fed one by one down the inclined chute 116. Referring more particularly to Figs. 12 and 13, as the foremost core reaches the bottom of the chute 116, it comes to a position opposite a slide 117, which latter is then actuated to push the core into position over the fixed half mold in which it is to be placed. The slide 117 is operated by a crank 118 pivoted at 119, the crank being actuated by a downwardly extending adjustable link 120, which at its lower end (Fig. 10) is connected to a rock arm 121 mounted on a rock shaft 122, the latter having a rock arm 123 connected to one end of a cam slide 124, while the other end of the cam slide is slidably mounted in the roller guides 125. The cam slide is provided on opposite faces with cam rollers 126 and 127, the first of which cooperates with a cam 128 mounted on the main drive shaft 7 to move the cam slide 124 to the right as shown in Fig. 10, while the cam roller 127 cooperates with a cam 129 on the main drive shaft 7 to move the cam slide 124 to the left as shown in Fig. 10. These cams are properly timed to actuate the slide 117 and push forward from the end of trough 116 a wound core when a pair of balata filled half molds are in position to receive a core.

As the wound core is pushed forward by the slide 117, it moves on the inclined faces 130 formed on two arms 131 which are pivotally mounted at 132 and normally drawn toward each other by the coil spring 133. Movement of the arms 131 toward each other is adjustably limited by the stop screws 134. As the wound core 115 leaves the inclined faces 130, it is brought to a stop, directly over the mold sections in which it is to be placed, by the inwardly directed ends 135 on the arms 131. Downward movement of the core at this time is prevented by the small rollers 136 carried by the arms 131, and upon which the core rests.

*Core placing mechanism*

Directly above the core as it rests upon the rollers 136 is a head 137 carried by a plunger 138 (Figs. 12 to 14). At the bottom the head is provided with centering pins 139, which when the head is moved downwardly, are adapted to enter the dowel pin holes 96 in the fixed half mold section. In the bottom of the head 137 is a core receiving socket 140, and adjacent this socket the head is formed with opposed vertical slots 141, in which are loosely mounted core engaging fingers 142 provided with the enlarged gripping projections 143 at their lower extremities. At their upper ends the fingers 142 are provided with lateral extensions 144 against which bear the coil springs 145, and laterally opposite the extensions 144 the fingers are each provided with pivot or bearing projections 146 adapted to rest on the inner face of the head 137. It will be seen that as the head 137 descends upon a core resting on the rollers 136, the lower ends of the fingers 142 are spread outwardly by the core against the pressure of springs 145, and as the gripping projections 143 of the fingers pass below the equator of the core, the pressure of springs 145 forces the fingers together again to thereby hold the core in the socket 140. In the descent of the head 137 it then forces the core 115 down between the rollers 136, which latter spread apart to permit this by reason of the spring connection between the arms 131 in which they are mounted. As the centering pins 139 enter the dowel pin openings 96 in the fixed half mold section, the core is centered and is forced down into the fixed half mold, spreading the hot plastic balata as it is forced inwardly. During the downward movement of the head, the fingers 142 come in contact with the side edges of the mold and are forced outwardly and upwardly in the head 137 against the pressure of springs 145, so that when the core finally comes to rest in the mold, the enlarged ends 143 are spread apart and have been moved above the equator of the core. Therefore, when the head 137 is withdrawn, the fingers 142 tend to move downwardly and at the same time to swing inwardly by reason of springs 145, and since they are at this time above the equator of the core, they move slightly inwardly and upwardly on the surface of the core as the head is withdrawn, at the same time pressing downwardly on the core to maintain it within the mold. The plunger 138 of the head 137 is guided in a bracket 147 (Fig. 1) carried by the transverse plate 30, and at its upper end the plunger is connected by a link 148 (Fig. 2) to a rock arm 149 on the same rock shaft 104 which operates the balata ejecting devices. Thus it will be seen that at the same time that the balata ejecting plungers 97 and 98 are forcing balata blanks into a pair of empty mold halves, the plunger 138 is simultaneously forcing a core down into the pair of mold halves which have just been supplied with balata blanks.

*Mold swinging mechanism*

The operation of the Geneva stop mechanism next brings the pair of open mold halves which have been provided with balata blanks and a core to a position in which the contact pin 92 of the movable rack 89 is disposed below an actuating plunger 150 for the rack (Figs. 1, 2 and 20). The plunger 150 is held in a guide 150' secured to the transverse plate 30, and at its upper end the plunger is linked to a rock arm 151 (Fig. 2) mounted on the rock shaft 152, which latter has a second rock arm 153 connected to a downwardly extending link 154, the lower end of which is connected to one end of a crank 155 pivoted at 156 on the base 1. The other arm of the crank (Fig. 11) is connected to one end of a cam slide 157, the other end of which slide is movable in the roller guides 158. The cam slide is provided on opposite faces with cam rollers 159 and 160, the roller 159 cooperating with a cam 161 on the main drive shaft 7 to move the slide to the right as shown in Fig. 11, while cam roller 160 cooperates with a cam 162 mounted on the main drive shaft 7 to move the cam slide 157 to the left as shown in Fig. 11. These cams are so timed as to operate the plunger 150 when the action of the Geneva stop mechanism has brought the rack 89 of a pair of half mold sections beneath the plunger. In its downward movement, the plunger 150 pushes down the rack 89 and thereby, through the pinion 88, rotates the hollow shaft 77 to bring the movable mold half section 67 with its contained balata blank over the fixed half section 57 with its contained balata blank and core.

*Mold closing operation*

At the next actuation by the Geneva stop mechanism, the filled mold is brought to a point where a ram engages the top of the mold to force it into entirely closed position and thereby cause the plastic balata to flow completely around the centrally held core and entirely fill the mold cavity. A head 163 carries the ram 164 (Fig. 8) which latter is split or divided in order that it may engage the top of the movable mold section without injury to the ejecting pin projecting from the top of the mold. In order that a yielding pressure may be exerted by the ram, the head 163 is slidably mounted on a plunger 165 with a coil spring 166 disposed on the plunger between the top of the head 163 and the retaining and adjusting nuts 167. Rotary movement of the head on the plunger is prevented by pins 168 on the head engaging a vertical slot 169 in the plunger. In order to prevent strain on the main turntable 28 when the ram 164 descends, an adjustable abutment 170 is disposed beneath the turn table 28 in alignment with the pair of mold sections which are to be operated upon, the main turntable 28 just clearing the abutment 170 in its rotation. The plunger 165 is held in a guide 171 and extends down to a point adjacent the base 1, where it is pivoted to a lever 172 pivotally mounted at 173 (Figs. 1, 3, 7). One end of this lever is provided with a cam roller 174 which is movable in the cam slot 175 of a cam 176 mounted on the end of the main drive shaft 7. Hence it will be seen that as the plunger 165 is drawn downwardly by the action of the cam, the ram 164 is resiliently pressed downwardly upon the upper mold half section 67 to completely close the latter and mold the balata blanks around the centralized core in the mold.

*Mold cracking mechanism*

In the next operation the closed mold arrives at the station where the mold is "cracked", that is, the upper and lower half sections are slightly forced apart. At this time the closed mold has arrived at a position in which the mold cracking plunger 94 is disposed directly above the end of a rock arm 177 (Figs. 1, 2, and 29), which is then moved upwardly to push the plunger 94 against the lug 93 on the top mold section and force the two halves slightly apart. The rock arm 177 is mounted on a rock shaft 178, which shaft also carries a rock arm 179, the outer end of which is connected by link 180 to one end of the lever 172, which lever, as before stated, operates the mold closing ram through cam 176 in the previous operation. Therefore, at the same time the cam 176 is completely closing one pair of molds it is "cracking" a pair previously closed.

In order to prevent any likelihood of the molded ball sticking to the upper half of the mold during the "cracking" operation, the previously described ejector pin 71 is provided in the upper mold half section. At the time of the cracking operation, the outer projecting end of the pin 71 has arrived at a position directly below the fixed stop 181 (Fig. 2) and just clearing the stop. Therefore, it will be seen that at the time the rock arm 177 moves the mold cracking plunger 94 upwardly to separate the mold halves, the ejector pin 71 in the upper mold half is fixedly held by the stop 181 and therefore prevents the molded ball from sticking in the upper half of the mold.

Mold opening mechanism

The "cracked" mold is then moved by the Geneva stop mechanism to the station where the mold is fully opened. At this time the contact pin 92 of the mold opening rack 90 has arrived at a point directly below a plunger 182 (Figs. 1 and 2). This plunger is movable in a guide 183 carried by the transverse bar 30, and at its upper end the plunger is linked to a rock arm 184 mounted on a rock shaft 185, which latter carries a second rock arm 186 connected by the adjustable link 187 to a rock arm 188 mounted on the rock shaft 152, which latter rock shaft, as before described also operates the plunger 150 for closing a mold at a previous station. As the plunger 182 is operated, it comes in contact with the contact pin 92 of the mold opening rack 90, which latter through the pinion 88 swings the movable mold half section 67 to open position.

Ball ejecting mechanism

The turn table is then operated by the Geneva stop mechanism to bring the open mold to a position where the molded ball is first slightly elevated and then ejected from the mold. At this point the fixed mold half section has arrived at a position where the ball ejecting pin 61 is directly over the end of a rock arm 189 (Fig. 2), which rock arm is mounted on a rock shaft 190, the latter having another rock arm 191 connected by the link 192 to a rock arm 193 rigidly mounted on the rock shaft 178, which latter, as previously pointed out, also operates the mold cracking plunger 94 at a previous station. Movement of pin 61 by the above described mechanism slightly elevates the molded ball to a position where it can be readily ejected.

Figure 22:
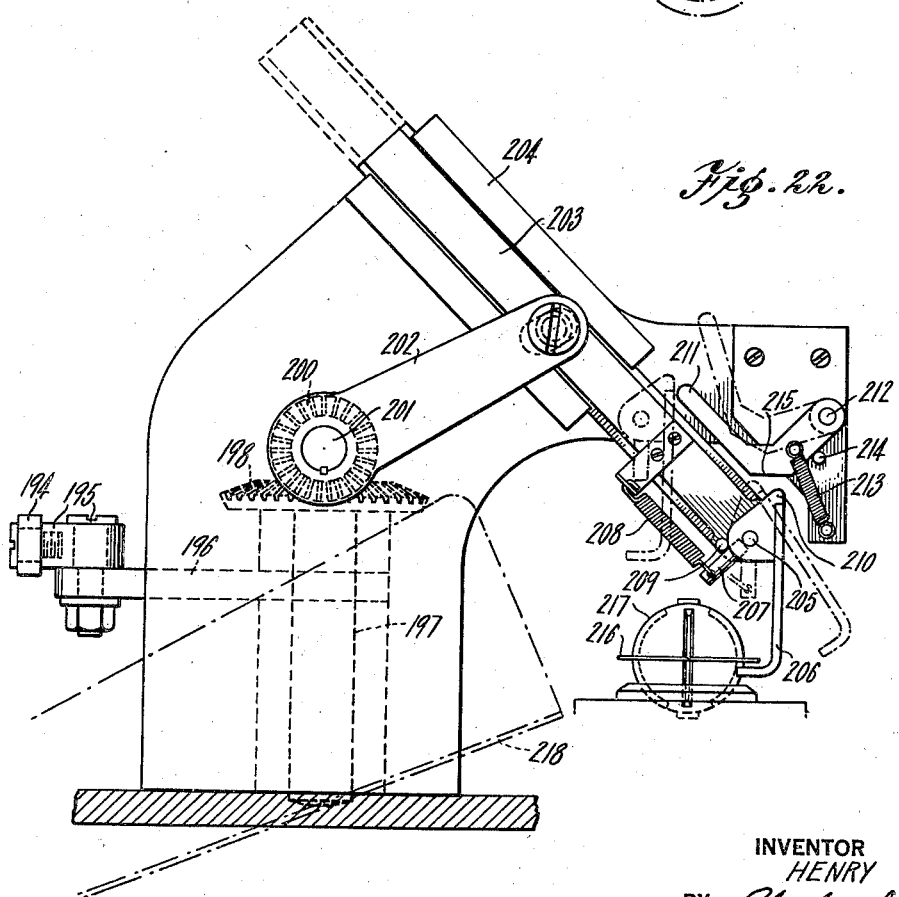
Figure 22 is a detail side elevation of the ball ejecting mechanism.

Adjacent its upper end the rock arm 193 is connected to a link 194 (Figs. 1, 2, 21, 22), which latter in turn has a pivot connection 195 with an operating arm 196 rigid on the shaft 197 of a gear 198 mounted in the bracket 199, which gear meshes with a gear 200 carried on a shaft 201, the latter having rigidly connected thereto an arm 202 for operating a slide 203 in the guideway 204. Pivotally mounted on the slide 203 at 205 is a ball ejecting hook 206, the body portion of the hook being provided with a projecting pin 207 to which is secured a coil spring 208, the spring also being secured to the slide 203. Movement of the hook under the tension of spring 208 is limited by a stop pin 209 on the slide 203, which stop pin is adapted to engage the pin 207. The body portion of the hook is also provided with a rounded nose 210 for a purpose to be described. An angle member 211 is pivotally mounted at 212 on the frame and is urged in a downward direction by the coil spring 213, a stop pin 214 being provided to limit this downward movement to a point where the free arm of angle member 211 is substantially parallel to slide 203. In a ball ejecting operation, the slide 203 is moved downwardly, thereby moving the hook 206 downwardly from its extreme left hand position shown in dotted outline in Fig. 22. In this movement the nose 210 on the body portion of the hook 206 engages the free arm of angle member 211, and by reason of such engagement the hook 206, against the pull of spring 208, is brought to a position substantially parallel with the slide 203, but as the slide progresses, the nose 210 passes off the straight portion of the angle member 211 onto cam or inclined portion 215, and spring 208 then actuates the hook to bring it into the position shown in full lines in Fig. 22. In this position it will be seen that the end of the hook is disposed beneath the flash or overflow portion 216 on the molded ball 217. The slide 203 is then retracted, and as the nose 210 engages the inclined portion 215 of the angle member 211, the latter is forced upwardly against the pull of spring 213 to the dotted line position shown in Fig. 22, and as during the retracting movement of the slide 203, the hook 206 is not only raised but drawn to the left as shown in Fig. 22, it trips the molded ball out of the fixed mold section and into the discharge chute 218. When the slide 203 is completely retracted, the angle member 211 returns to its full line position, and the hook 206 is in the position shown by the extreme left hand dotted outline, ready for movement downwardly again to engage another ball.

Ejector pin retractor mechanism

The open and empty mold then moves towards the starting position again, and in this movement it arrives at a position where the ejector pins 61 and 71 are directly under the plungers 219 and 225 (Figs. 15, 2, 1), which are designed to push down the ejector pins to their inoperative position before again supplying the mold halves with balata blanks. The plunger 219 is movable in a guide 220 mounted on the transverse plate 30, and at its upper end the plunger is connected by a link 221 with a rock arm 222 on a rock shaft 223, which is provided with a second rock arm 224. The plunger 225 is movable in a guide 226 mounted on the transverse plate 30, and at its upper end is connected by a link 227 to a rock arm 228 mounted on a rock shaft 229, which latter is provided with a rock arm 230 connected by a link 231 to the rock arm 224. The rock arm 224 is connected by a link 232 to a rock arm 233 mounted on the rock shaft 104, which latter, as before pointed out, operates both the balata placing mechanism and the core placing mechanism. The open mold half sections, after depression of the ejector pins 61 and 71, then move to their original station beneath the balata feeding disc 16 where they are again supplied with balata blanks and the cycle of operations repeated.

Timing of steam and water supplies

By reference to Fig. 5, it will be seen that the water cam 51 and steam cam 52 are so designed that about the time a molded ball is discharged from the mold, the cam roller of the water valve for that mold passes off of cam 51 thereby shutting off the supply of water to the mold halves, and about the same time the cam roller of the steam valve contacts with the steam cam 52 to open the valve and admit steam to the mold halves. The steam valve is then held open during the operations of charging the mold with balata blanks, placing a core in the mold, swinging over the top half and entirely closing the top half to thereby mold balata completely around the core. About the time the molding operation is completed, the cam roller of the steam valve passes off of the steam cam 52, and shortly after the cam roller of the water valve again engages the water cam 51 to open the valve and admit cooling water to the closed mold. Water then passes through the mold until the latter reaches the point at which the molded ball is ejected, when, as before stated, the water valve is then closed by the passing of its roller off of the cam 51, and steam is again admitted to the open mold.

The temperature of the cooling water or other cooling medium may, of course, be varied according to conditions, and in cool weather an ordinary cold water supply may be used for cooling the molds, while in hot weather, it may be desirable to supply ice water to the mold. The balata blanks, as supplied from the balata extruding machine, are in a hot plastic condition, and since the time interval between the charging of the mold with the blanks and core and the time when the mold is completely closed by the ram 164 is relatively short, it may be unnecessary, particularly in warm weather, to use a steam supply or other heated medium for heating the molds, and in such case the cam rollers for the steam valves may be merely disconnected to render the latter inoperative or the steam supply may be shut off from the machine.

*Operation*

In Figures 23 to 33 the various steps are shown diagrammatically.

In operation a supply of wound cores 115 is placed on the table 114 and fed downwardly one by one through the chute 116 ready for placing in a mold. The extruder 22 supplies hot plastic balata through the nozzle 21, which balata is then fed in accurately measured amounts into the openings 17 and 18 in the balata measuring and feeding disc 16, and in the step by step rotation of the disc a filled opening 17 and a filled opening 18 are brought into position directly above a pair of empty mold halves, as shown in Fig. 23.

At this time the balata ejecting plungers 97 and 98 are operated to push down the balata blanks 234 and 235 from the openings 18 and 17 into the respective fixed and movable mold halves (Fig. 24), and upon retraction of the plungers the mold halves then move to the next station, at which a wound core 115 at the end of the chute 116 (Figs. 12 and 13) is ejected by the slide 117 and moved outwardly until it rests upon the rolls 136, directly above the fixed mold half. The head 137 then descends and is centered on the fixed mold half by the pins 139 entering the dowel pin holes 96 in the mold half. During the first part of the descent the wound core spreads apart the fingers 142 and is centered in the socket 140, the fingers 142 then closing on the core below its equator to hold it in the socket. In the further descent of the head 137 the core spreads apart the small rollers 136 which support the core and the latter is inserted in the fixed mold half (Fig. 25). In this downward movement the fingers 142 contact with the side edges of the mold and are spread apart and pushed upwardly with respect to head 137, so that their enlarged gripping projections 143 come above the equator of the core. The head 137 is then withdrawn and in this movement the fingers 142 tend to move inwardly and at the same time ride up on the upper surface of the wound core, thereby retaining it in position while the head is being withdrawn.

In the further movement of the mold halves by the rotation of table 28, the contact pin 92 of rack 89 comes beneath the plunger 150 and the latter then descends to operate the rack and thereby swing over the movable half of the mold on top of the fixed half (Fig. 26). In the further movement of the table 28 the closed mold then comes beneath the ram 164, which latter is then operated to press down the upper half of the mold to completely close it and cause the plastic balata to flow completely around the centered core, the fixed abutment 170 at this time cooperating to prevent distortion or injury of the table 28 by reason of pressure of the ram 164 (Figs. 27 and 8). At this time, as before stated, the supply of steam to the mold is cut off and cold water is supplied instead (Fig. 28). The closed mold then continues its movement during which it is properly cooled and then arrives at the point where the mold is cracked. This operation is performed by the rock arm 177, which is then in a position directly below the mold cracking plunger 94. When the rock arm 177 is moved upwardly, the plunger is forced upward against the lug 93 on the top mold section and forces the two halves of the mold slightly apart. Sticking of the molded ball to the upper mold half at this time is prevented by the fixed stop 181, which during the mold cracking operation is disposed directly over the pin 71 in the top mold half. Therefore, this pin is held stationary, and in the event that the ball tends to stick to the upper mold half and rise with it, the pin 71 frees the ball and maintains it in the lower mold half (Fig. 29).

In the further movement of the mold, it arrives at the point where the upper half mold is swung open, which operation is performed by the plunger 182 moving downwardly against the contact pin 92 of the rack 90, and the latter in its downward movement swings the upper mold half over into completely open position (Fig. 30).

The open mold is then moved to the point at which the ball is first raised and then ejected. At this time the ball ejecting pin 61 has arrived directly over the end of the rock arm 189, and when the latter is given a limited upward movement, the pin 61 is moved upwardly to slightly elevate the molded ball in the lower mold half. The slide 203 is then operated to move downwardly the ball ejecting hook 206, and as the latter moves clear of the angle member 211, it is swung downwardly by the spring 208 until the end of the hook engages beneath the overflow or flash 216 on the molded ball 217. In the return movement of the slide 203, the hook 206 trips the ball out of the mold and into the chute 218 (Figs. 31 and 22). At about this time the cold water supply to the mold is cut off, as before stated, and steam again turned on (Fig. 32), after which the pins 61 and 71 of the empty heated mold are first reset by the ejector replacing plungers 219 and 225 (Fig. 33), and the mold then again comes into position to receive fresh balata charges.

It will be seen that by my invention the previous objectionable procedure of first molding balata into rough hemispherical halves before placing the halves on the wound core is completely obviated, together with all of the disadvantages attending this procedure. The balata is never permitted to cool from the time it is supplied in heated plastic condition by the extruder to the balata measuring device until it is placed in the mold along with a core and the mold closed to carry out the molding operation. Hence, there is no loss of time and labor, and no necessity for reheating previously molded half covers. If the stock is intended to be vulcanized and contains high powered vulcanizing ingredients, there is a minimum time interval between the supplying of the stock and its preliminary molding on the core, and hence the risk of prevulcanization is greatly reduced. Due to the centralizing projections 60 and 70 in the mold halves, the wound core is held absolutely centered during the flow of the balata cover stock around it, and since the cover stock is supplied to the mold in a heated plastic condition, there is no tendency whatever for it to distort the core by reason of flow under pressure before the balta has become properly plasticized.

The entire operation is continuous and automatic, involving nothing more on the part of the operator than the supply of balata to the extruder 22 and of wound cores to the table 114. As a result, the preliminary molding is carried out at a maximum speed and with a minimum requirement for heat, labor and space.

While in the specific embodiment shown and described the invention is applied to the preliminary molding of a balata cover around a golf ball core, it is obvious that it is of wider application and can be utilized in many molding operations where it is desired to mold plastic material as such or upon a core of any kind. It is therefore not desired to limit the invention otherwise than as set forth in the appended claims.

Having thus described my invention, what I claim and desire to protect by Letters Patent is:

1. In a molding apparatus, a divided mold having substantially spherical mold cavities, core centering ribs extending inwardly from the walls of the mold cavities and arranged on great circles passing at right angles through the line of division between the mold sections.

2. In a molding apparatus, a mold having an upper and lower section, means for pivotally connecting said upper section to said lower section for relative movement in a vertical plane in respect to said lower section, and core centering ribs projecting inwardly from the walls of the mold cavities and arranged on great circles within vertical planes.

3. In a molding apparatus, a rotatable carrier having disposed thereon a series of pairs of pivotally connected mold sections, one section of which is fixedly mounted, a pinion rigid with the movable section, a pair of racks engaging said pinion, and spaced means adjacent the carrier for first operating one rack to swing the movable section over the fixed one and for subsequently operating the other rack to swing the movable section to open position.

4. In a molding apparatus, a rotatable carrier, a series of two part molds mounted on said carrier, means disposed around said carrier for successively opening said molds so that a mold cavity in each part faces upwards, means for charging the open cavities in both parts, and means for closing the molds.

5. In a molding apparatus, a movable carrier, a series of sectional molds mounted on said carrier, mechanism operated in synchronism with the movement of said carrier comprising means for opening said mold so that the cavities in the mold sections face upwards, means for simultaneously charging each upwardly facing cavity, and means for closing said molds.

6. In a molding apparatus, a movable carrier, a series of molds mounted on said carrier, each of said molds having an upper and a lower section having cooperating mold cavities therein, mechanism operated in synchronism with the movement of the carrier comprising means for swinging the upper section from over said lower section so that the cavities therein face upward, means for charging both upwardly facing cavities with blanks of plastic material, means for placing a core on the blank in the lower section, and means for swinging the upper section over the lower section and forcing the plastic material around the core.

7. In a molding apparatus, a movable carrier, a series of molds mounted on said carrier, each of said molds having an upper and a lower section having cooperating mold cavities therein, said cavities having core centering means therein, mechanism operated in synchronism with the movement of the carrier comprising means for swinging the upper section from over said lower section so that the cavities therein face upward, means for charging both upwardly facing cavities with blanks of plastic material, means for placing a core on the blank in the lower section, and means for swinging the upper section over the lower section and forcing the plastic material around the core.

8. In a molding apparatus, a series of sectional molds mounted on a movable carriage, mechanism operable at successive positions of said carriage comprising means for opening said molds so that their mold cavities face upward, means for measuring blanks of plastic stock and depositing a blank in each open mold section, means for placing cores in said open molds, and means for closing said mold sections with the cores between said blanks.

9. In a molding apparatus, a series of sectional molds mounted on a movable carriage, mechanism operable at successive positions of said carriage comprising means for opening said molds so that their mold cavities face upward, means for measuring blanks of plastic stock and depositing a blank in each open mold section, means for placing a core in one section of each mold, means independent of the mold closing means for forcing the core under pressure into the blank of plastic balata contained in said section with said core, and means for closing said mold sections with the cores between said blanks.

10. In a molding apparatus, means for moving pairs of cooperating mold sections in a closed path, mechanism operated in synchronism with the movement of the molds in said path comprising means for opening said molds, means for supplying blanks of cover stock to said open sections, means for supplying a core to one section, means for closing the sections to mold the cover stock on the core, and means for cooling the closed mold.

11. In a molding apparatus, means for moving pairs of cooperating mold sections in a closed path, means for preheating each pair of sections during a portion of their travel, means for supplying preheated cover stock and a core to each pair while the mold is open, means for closing each pair to mold the cover stock on the core, means for cooling the closed mold, and means for opening the mold and discharging the cooled molded article.

12. In a molding apparatus, a movable carrier having disposed thereon a series of cooperating upper and lower mold sections, automatic means for successively charging, closing, opening and discharging said mold sections, means disposed in each upper mold section and operable upon raising of the section for retaining the molded article in the lower section and means for discharging the article.

13. In a molding apparatus, a sectional mold for molding an article having a molding overflow thereon, means for first slightly elevating the molded article in the open mold, and means for then engaging the article by its molding overflow and ejecting it from the mold.

14. In a molding apparatus, a movable carrier having disposed thereon a series of sectional molds, one section of each mold being fixed in reference to the carrier, means disposed along the path of the molds for successively charging, closing, and opening the molds, means for retaining a molded article in the fixed section upon opening each mold, means in the fixed section for slightly elevating the article subsequent to the opening of the mold, and means for then ejecting the article.

HENRY Z. COBB.